(12) United States Patent
Yang et al.

(10) Patent No.: US 7,768,177 B2
(45) Date of Patent: Aug. 3, 2010

(54) COMPACT SIZE ELECTROMECHANICAL TRANSLATION APPARATUS

(75) Inventors: Guomao Yang, Nepean (CA); John Joseph Kuta, Oakville (CA)

(73) Assignee: EXFO Photonic Solutions Inc., Mississauga (CA)

( * ) Notice: Subject to any disclaimer, the term of this patent is extended or adjusted under 35 U.S.C. 154(b) by 266 days.

(21) Appl. No.: 12/114,712

(22) Filed: May 2, 2008

(65) Prior Publication Data

US 2008/0272673 A1 Nov. 6, 2008

Related U.S. Application Data

(60) Provisional application No. 60/924,234, filed on May 4, 2007.

(51) Int. Cl.
*H01L 41/08* (2006.01)
(52) U.S. Cl. ...................................... 310/328; 310/366
(58) Field of Classification Search ................ 310/328, 310/323.02
See application file for complete search history.

(56) References Cited

U.S. PATENT DOCUMENTS

| 5,089,740 | A  | * | 2/1992 | Ono ............................ 310/328 |
| 5,332,942 | A  | * | 7/1994 | Rennex ....................... 310/328 |
| 7,045,932 | B2 | * | 5/2006 | Xu et al. ................. 310/323.17 |
| 7,218,035 | B2 | * | 5/2007 | Khajepour et al. .......... 310/328 |

* cited by examiner

*Primary Examiner*—Mark Budd
(74) *Attorney, Agent, or Firm*—Thomas Adams

(57) ABSTRACT

A linear electromechanical translation apparatus is provided of the type comprising first and second clamps fixed to a support, first and second elongate movable members each extending through one of the clamps, and an extension actuator connected between the movable members and adapted to move each one of the elongate movable members longitudinally relative to the other member as the extension actuator is extended or retracted. The apparatus is characterized in that the first elongate movable member has a rear end connected to a front end of the extension actuator, and the second movable member has a rear end connected to a rear end of the actuator and has a forwardly extending elongate portion which lies beside and parallel to the first elongate movable member. Both the clamp assemblies may be located forwardly of the front end of the actuator.

14 Claims, 14 Drawing Sheets

COMPACT SIZE ELECTROMECHANICAL TRANSLATION APPARATUS

CROSS-REFERENCE TO RELATED APPLICATION

This application claims priority from U.S. Provisional patent application Ser. No. 60/924,234 filed May 4, 2007, the entire contents of which are incorporated herein by reference.

BACKGROUND OF THE INVENTION

1. Field of the Invention

The present invention relates to electromechanical translation apparatus of the incremental type capable of precise positioning of articles, for example tools, using an extension actuator usually formed of piezoelectric material. This invention has particular application to a linear actuator or positioner for use in a confined space.

2. Prior Art

Modern technologies often require precision positioning devices. Piezoelectric material based stepping actuators are among the best choices for ultra high resolution actuation due to the unique features of the piezoelectric phenomena. Beside sub-nanometre resolution, high stiffness, and long travel range such as offered by the available EXFO Burleigh "Inchworm"™ piezoelectric-based stepping actuator, more and more applications require positioners to have also the capability of handling heavy loads, excellent stability over very long periods, as well as extended lifetime.

In typical incremental electromechanical translation apparatus, such as linear stepping actuators, high resolution stepwise microscopic movement of a movable member is effected by expanding an extension actuator (e.g. a piezoelectric element or stack) while one of its ends is fixed, as by a clamp, relative to a stationary reference and the other end is free to move, then releasing the one end, fixing the other end by another clamp, and allowing the actuator to contract. Repeating this cycle provides very precise step-by-step movement of a movable member.

The prior art shows three types of arrangements for the movable member, clamps and extension actuator, i.e.:

A. In apparatus as used earlier versions of in the Burleigh "Inchworm™" apparatus, shown for example in U.S. Pat. Nos. 3,902,084 to May, Jr. and U.S. Pat. No. 3,902,085 to Bizzigotti, both issued Aug. 16, 1975, the extension actuator is held stationary at or near its central area, and its opposite ends are each attached to one of two clamps which selectively clamp onto a linearly movable member in the form of a shaft. Other U.S. patents showing this basic arrangement are:

U.S. Pat. No. 4,874,979, issued Oct. 17, 1989 to Rapp;
U.S. Pat. No. 5,319,257, issued Jun. 7, 1994 to McIntyre;
U.S. Pat. No. 6,800,984, issued Oct. 5, 2004 to Marth.

B. In another form of apparatus the extension actuator is incorporated in the movable member, along with two selectively operable clamps, so that both the extension actuator and the clamps move linearly relative to a fixed member. Such arrangements are shown, for example, in the following U.S. patents:

U.S. Pat. No. 3,377,489, issued Apr. 9, 1968 to Brisbane;
U.S. Pat. No. 3,684,904, issued Aug. 15, 1972 to Galutva et al.;
U.S. Pat. No. 4,709,183, issued Nov. 24, 1987 to Lange;
U.S. Pat. No. 5,751,090, issued May 12, 1998 to Henderson, and
U.S. Pat. No. 6,380,661, issued Apr. 30, 2002 to Henderson et al.

C. A third arrangement is shown in U.S. Pat. No. 7,045,932, issued May 16, 2006 to Xu et al., and is referred to herein as the "new generation" Burleigh "Inchworm"™ design. Here again, an extension actuator moves linearly with a movable member or shaft, but the clamps are stationary. U.S. Pat. No. 5,034,647, issued Jul. 23, 1991 to Ohtsuka, also shows an arrangement in which the clamps are stationary and the extension actuator moves with a movable member; however this is a rotary mechanism and not a linear device of the type with which the present invention is concerned.

The device of the Xu et al. patent has the advantage over the other prior art linear devices that, since the clamps are stationary, even if these clamps are relatively heavy, they do not impose any inertia forces on the shaft movement, and this allows for rapid operation of the mechanism. The specific design shown in the Xu et al. patent also has the advantages that:

1. Each of the clamps features a power-off holding lock such that each clamp is held closed while power is off;
2. The piezoelectric elements in the system are preloaded. This makes the load on the piezoelectric elements well controlled and the piezoelectric elements are working in compressive mode for better reliability. Since the strength of a piezoelectric ceramic element is much weaker when it is working in tensile mode or shear mode, as compared to compression mode, those former modes are minimized during the motor operation as well as during the power-off holding.

The development work done by other parties also gained some success with concepts similar to those introduced by EXFO Burleigh as well as with some variation on the actuation design details. An example is the product series NEXLINE (Trademark) actuators from Physik Instrumente (PI) GmbH which were developed recently, as described in U.S. Pat. No. 6,800,984 to Marth.

Although many of the actuation features provided by the NEXLINE actuator are comparable to those of a Burleigh "Inchworm"™ actuator, the reliability of a NEXLINE system is still questionable, particularly when the actuator is used for supporting heavy load, such as holding heavy-weight optical assemblies in the applications of semiconductor industry as well as in large telescope systems. In the case of the NEXLINE design of the aforesaid Marth patent, the piezoelectric elements are directly involved in the support structure which always bears the heavy load, even when the actuator is in the power-off holding state. For a piezoelectric ceramic material, the impact of excessive mechanical load upon the performance and lifetime is as serious as excessive electrical load. Therefore the reliability of a NEXLINE actuator is compromised due to its operation concept. Compared to the "new generation" Burleigh "Inchworm"™ design of the Xu et al. patent, the disadvantage in reliability is obvious, particular with heavy load over a long period of time, although it is also electrically load-free at power-off state.

Another weakness of the NEXLINE actuator is that high shear force on the piezoelectric elements is a fundamental characteristic caused by the operational mechanism of the NEXLINE design. The shear force is a considerable reliability risk since the shear strength of a ceramic material is much weaker than the strength in the compressive mode and, in the multilayer stack case, the relatively weak bonding lines are directly stressed because of the large shear force needed for the operation. The "new generation" Burleigh "Inchworm"™ design is again superior for the long term reliability of the actuator since its piezoelectric elements are working in compressive mode.

From the performance and reliability point of view, the design of the "new generation" Burleigh "Inchworm"™ actuator described in the Xu et al. patent is very good. However, it requires a relatively large mounting space due to the large aspect ratio of the design; the length of the actuator cannot be easily reduced. In some applications, such as for the positioning of optical assemblies in a semiconductor manufacturing system, the allowable space in the motion direction for mounting a linear actuator is limited. A more flexible design is needed for the actuator to be able to be implemented in more applications. As shown in the aforementioned Xu et al. patent, the shaft of the "new generation" Burleigh "Inchworm"™ actuator contains an extension piezoelectric element which divides the shaft into two parts. While one part is clamped, the other part can be moved against the clamped part by controlling the piezoelectric element to realize the extension. By controlling the clamping of these two parts and the extension action, the shaft can be moved linearly in either direction along the axis of the extension action. In Xu et al. the clamps are located beyond opposite ends of the extension element in the motion direction. This makes the length or aspect ratio large relative to the range of travel since in the motion direction the system needs the space to line up three key components, namely clamp-extension-clamp, and a large travel range requires extra length at each end for clamping. The travel range is limited by the distance between two clamps after subtracting the length needed for the extension element and for keeping the structure strong.

SUMMARY OF THE INVENTION

The present invention seeks to overcome or at least mitigate these limitations, specifically by folding the clamp-extension-clamp structure so that the aspect ratio of the actuator can be reduced and the geometry of the actuator can be easily varied to accommodate the requirements of individual applications. As a result, one may reduce the actuator size in the motion direction significantly as compared with the device of the Xu et al. patent.

In embodiments of the invention, reconfiguration of the shaft described in Xu et al. obviates the need for the clamps to be located beyond the opposite ends of the extension element. Based on this concept, the length or aspect ratio can be reduced significantly while keeping the desirable features of the Xu et al. design and maintaining a good range of travel.

In accordance with this invention, there is provided a linear electromechanical translation apparatus comprising:
 a support;
 first and second clamp assemblies fixedly secured to the support;
 first and second elongate movable members each extending through one of the clamp assemblies; and
 an extension actuator connected between the movable members and adapted to move each one of the elongate movable members longitudinally relative to the other member as the extension actuator is extended or retracted;
 the first elongate movable member having a rear end connected to a front end of said extension actuator, and said second movable member having a rear end connected to a rear end of the actuator and a forwardly extending elongate portion which lies beside and parallel to said first elongate movable member.

The arrangement is such that successive extension and retraction of the extension actuator cause the movable members to move progressively and linearly through the clamp means, with the extension actuator moving along with them.

In embodiments of this invention, the shafts, which Xu et al. show as projecting co-axially from the opposite ends of the extension actuator, are effectively folded so that main portions of these shafts are parallel and generally side-by-side, one being connected to a front end of the extension actuator and the other to the rearward end of this actuator.

Usually, both of the clamp assemblies are located forward of the front end of the extension actuator. However, arrangements within the scope of the invention are possible in which the elongate members are provided by extensions of a movable member itself connected to the actuator, in which case one or other of the clamp assemblies may, on occasion, be behind the actuator.

Preferably, in embodiments of the present invention the overall length occupied by the clamp assemblies is less than the length of said first movable member. The first elongate movable member may occupy a major part of the overall length of both of the movable members.

The second movable member may comprise a pair of parallel limbs joined at their rear ends by a cross member which abuts the rear end of the extension actuator, and the first movable member may include an inner movable member which lies inside the limbs of the second movable member, and end portions of the inner movable member may be connected to the said limbs by flexures which allow relative longitudinal movements of the members.

The parallel limbs of the second movable member may be joined at the front end by a further, front cross member so that the limbs and cross members surround the inner movable member, and a second extension actuator may be provided between the rear of the front cross member and the front end of said inner movable member. This inner movable member may have one or more elongate extensions which are parallel to the parallel limbs and which constitute said elongate first movable member extending through one of the clamp assemblies.

Using these extensions of the inner movable member may allow the clamping assemblies to act in a vertical direction on one of said elongate movable members and in a horizontal direction on the other of said elongate movable members.

As in the Xu et al. patent, each clamp assembly preferably comprises pressure means and clamp actuator means acting in opposition, the pressure means being operable for applying clamping force to releasably clamp the associated movable member to the clamp assembly when the actuator means is de-energized, and the clamp actuator means, when energized, acting against the pressure means to release the movable member.

Also, as in the Xu et al. patent, one or both elongate movable members may comprise a pair of elongate limbs connected together at their rear ends and extending through the clamp assembly, the clamp assembly comprising actuator means for controlling releasable clamping of the limbs to the clamping assembly. The clamp actuator means may have a single actuator means located between the limbs, acting in opposition to a pressure member that applies pressure to clamp the limbs to the clamp assembly.

Also, as in Xu et al., the extension actuator assembly preferably comprises a piezoelectric actuator element housed by means for applying compressive stress to the actuator element.

BRIEF DESCRIPTION OF THE DRAWINGS

A preferred embodiment of the invention will now be described by way of example only with reference to the accompanying drawings, in which.

DETAILED DESCRIPTION OF THE PREFERRED EMBODIMENT

Figure 1:
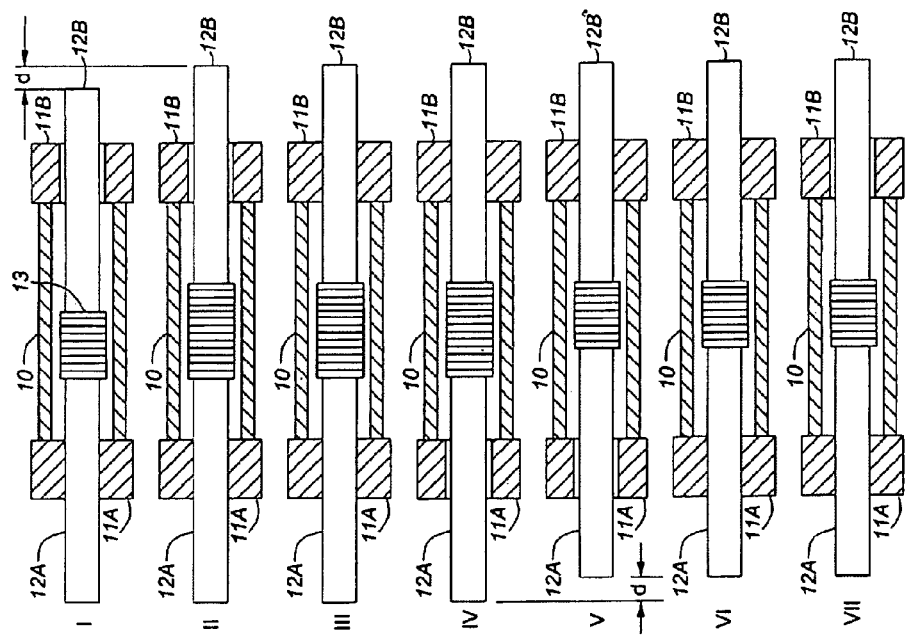
FIG. 1 is a diagrammatic view of the prior art arrangement of the Xu et al. patent, in successive positions.

FIG. 1 is a diagrammatic view of the "Inchworm"™ electromechanical translation apparatus shown in the aforesaid Xu et al. patent, showing seven successive positions of the assembly as portions 1, 11, etc. of FIG. 1 up to portion VII. As shown, a fixed support 10 carries at each of its ends first and second clamp assemblies 11A, 11B, fixedly secured to the support at widely spaced locations. Each clamp assembly is arranged to clamp onto one of two co-axial, elongate, longitudinally movable shaft members 12A, 12B, each of which has an inner end connected to one of the opposite ends of an extension actuator 13. As explained in the Xu et al. patent, and as will be evident from the successive stages shown in FIG. 1, extension and retraction of the extension actuator 13, along with alternate opening and closing of the clamp assemblies 1A and 1B, allows the shaft assembly, which comprises the co-axial movable members 12A and 12B and extension actuator 13, to move progressively relative to the fixed support 10.

It is evident from FIG. 1 that this assembly occupies substantial length; each shaft portion 12A, 12B must be at least as long as the required travel movement of the apparatus plus the length of a clamp assembly, and the total length of the apparatus is the length of two of the movable shaft portions plus the length of the extension actuator 13.

Figure 2:
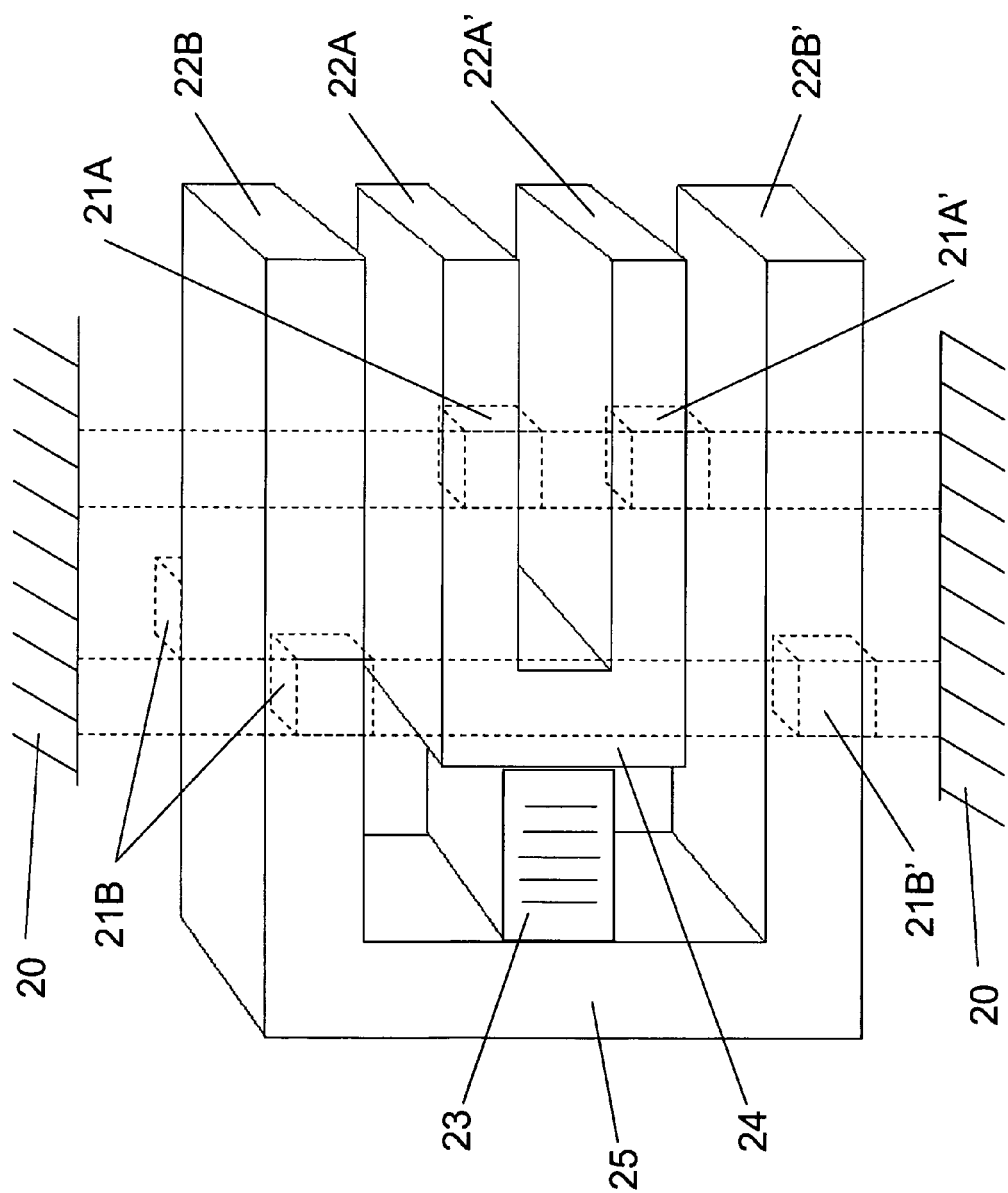
FIG. 2 is a schematic perspective view of the main components of an embodiment of the present invention, including the folded shaft arrangement, in a single position.

FIG. 2 shows a diagrammatic perspective view of one design of the apparatus of the present invention.

As indicated in FIG. 2, a support 20, which has upper and lower portions, carries the ends of two closely spaced pairs of clamp assemblies including inner clamp assemblies 21A and 21A' and outer clamp assemblies 21B and 21B', which are all fixed to the support 20. The clamp assemblies 21A and 21A' receive longitudinally movable, inner elongate shaft members 22A and 22A', respectively. Clamp assemblies 21B and 21B' receive longitudinally movable, outer elongate movable shaft members 22B, 22B', these being spaced outside members 22A and 22A' and lying parallel thereto. Rear ends of inner shaft members 22A and 22A' are connected by a rear cross member 24 lying perpendicular to these shaft members, while rear ends of outer shaft members 22B and 22B' are connected by a cross member 25 also perpendicular to the members 22B and 22B', so that the U-shaped part 22A, 24 and 22A' lies wholly inside the U-shaped part 22B, 25, 22B'. A central portion of cross piece 24 is connected to the front end of the extension actuator 23, while cross member 25 is connected to the rear end of actuator 23. Accordingly, extension actuator 23 causes the shaft members 22A and 22A' to move relatively to, and parallel to, the shaft members 22B and 22B'.

Operation of the apparatus of FIG. 2 is similar to that of FIG. 1, in that successive extension and retraction of the extension actuator 23, with suitable clamping and unclamping of the clamp assemblies 21A, 21A', 12B and 21B' can cause the shaft members 22A, 22A', 22B and 22B' to move progressively and rectilinearly through the clamp assemblies. It is evident that since the shaft members 22A, 22B, etc. are beside each other, rather than co-axial as in FIG. 1, the overall length of the apparatus is much reduced as compared to the apparatus of FIG. 1; in fact the length may be reduced by nearly one half its length as compared to the Xu et al. patent while keeping the features required for realizing the same actuation.

Figure 3:
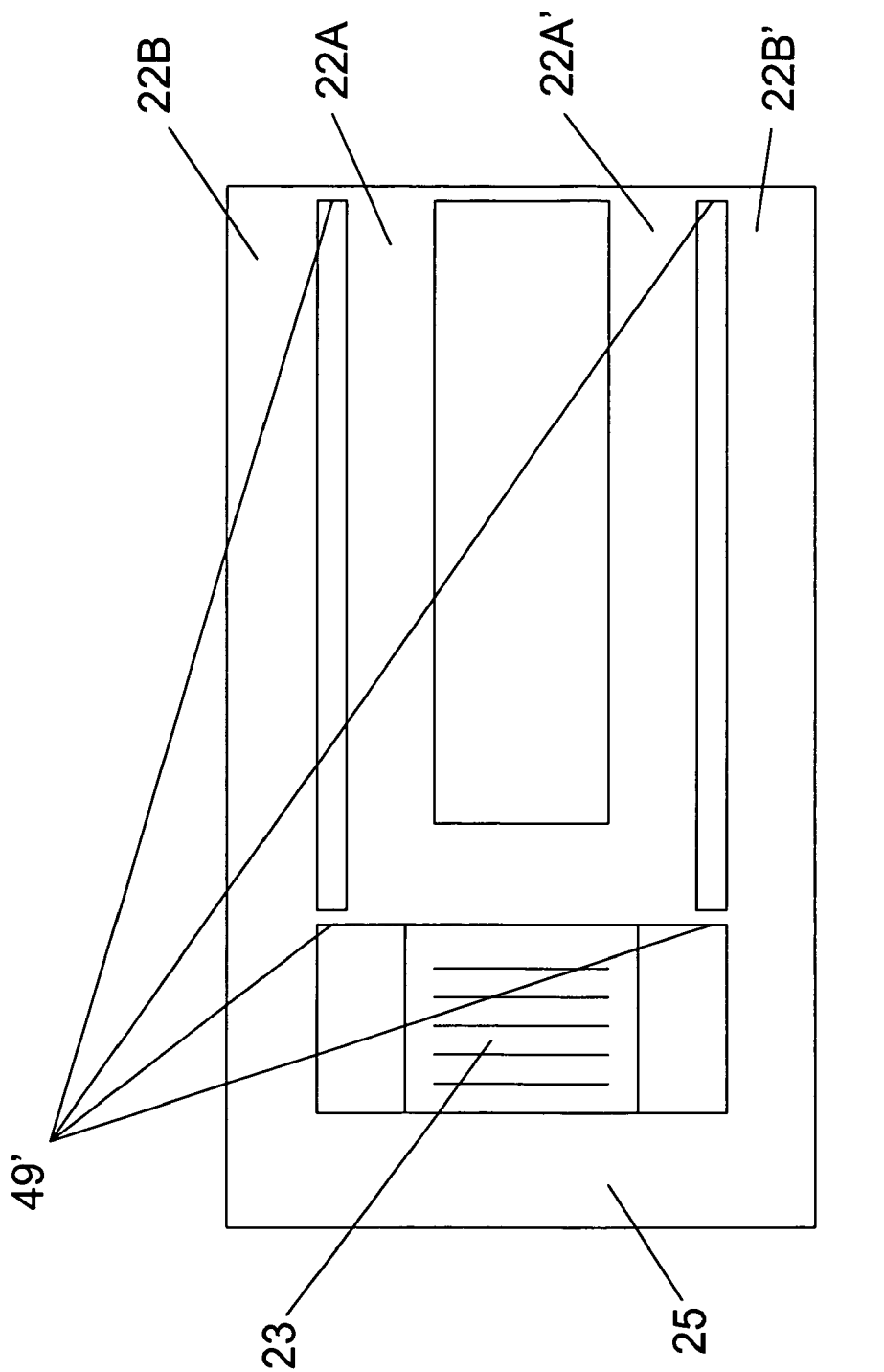
FIG. 3 is a top plan view of a shaft design used in its embodiment of the present invention.

FIG. 3 shows a preferred layout of the shaft structure, which incorporates four flexible hinges 49' connecting ends of the inner shaft portions 22A and 22A' to adjacent areas of the outer shaft portions 22B and 22B'. These flexible hinges 49' allow for relative rectilinear motion between the shaft portions, while at the same time maintaining a compressive force on the piezoelectric extension actuator 23; in this latter respect the hinges 49' perform a function similar to the flexures 49 of the Xu et al. patent which lie at the ends of the extension actuator 48 of that patent. This arrangement of hinges makes the shafts more light, stiff than the design of the Xu et al. patent.

Figure 4:
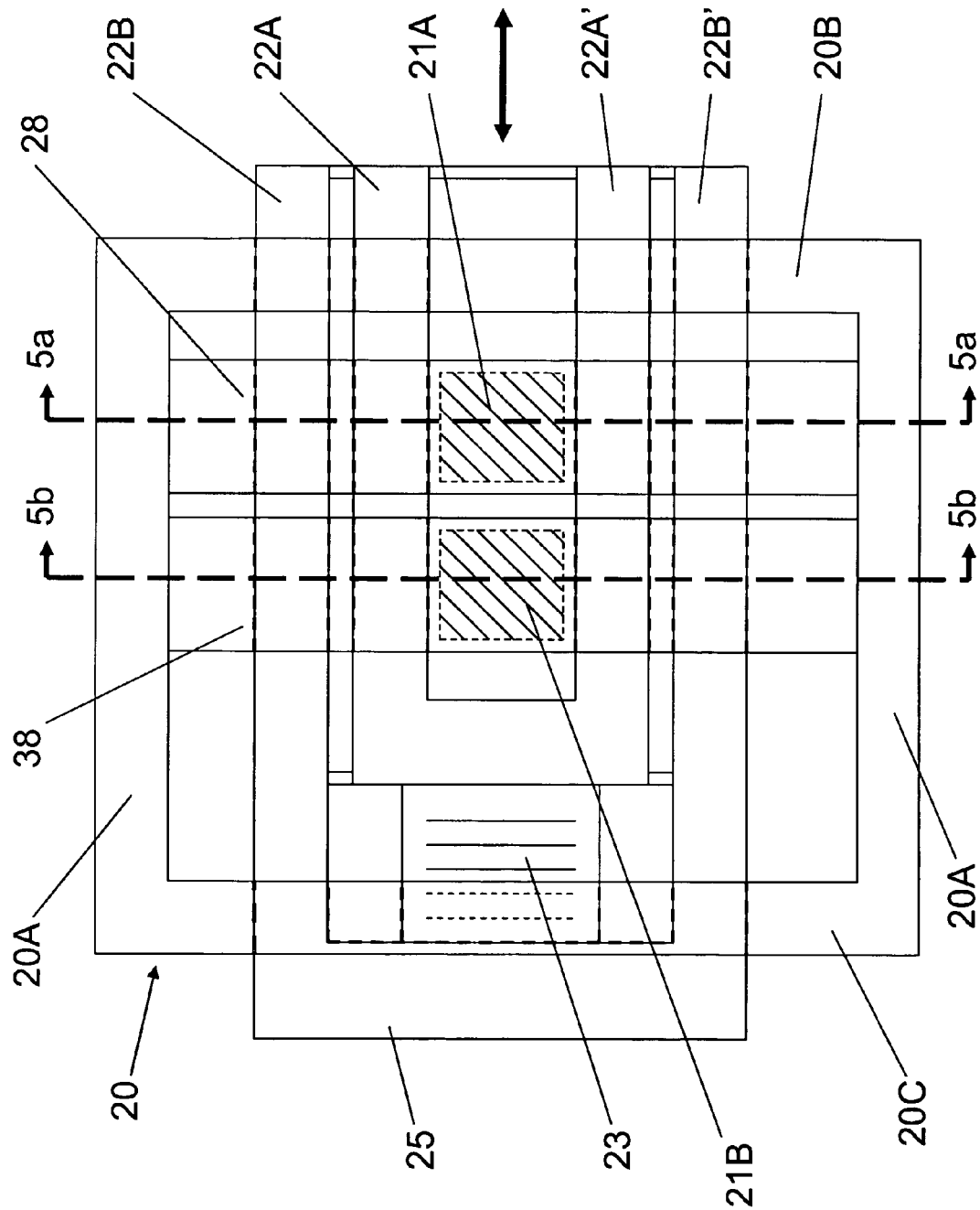
FIG. 4 is a diagrammatic sectional top plan view of parts of the apparatus including the shaft of FIG. 3, a frame and clamps.
Figure 5A:
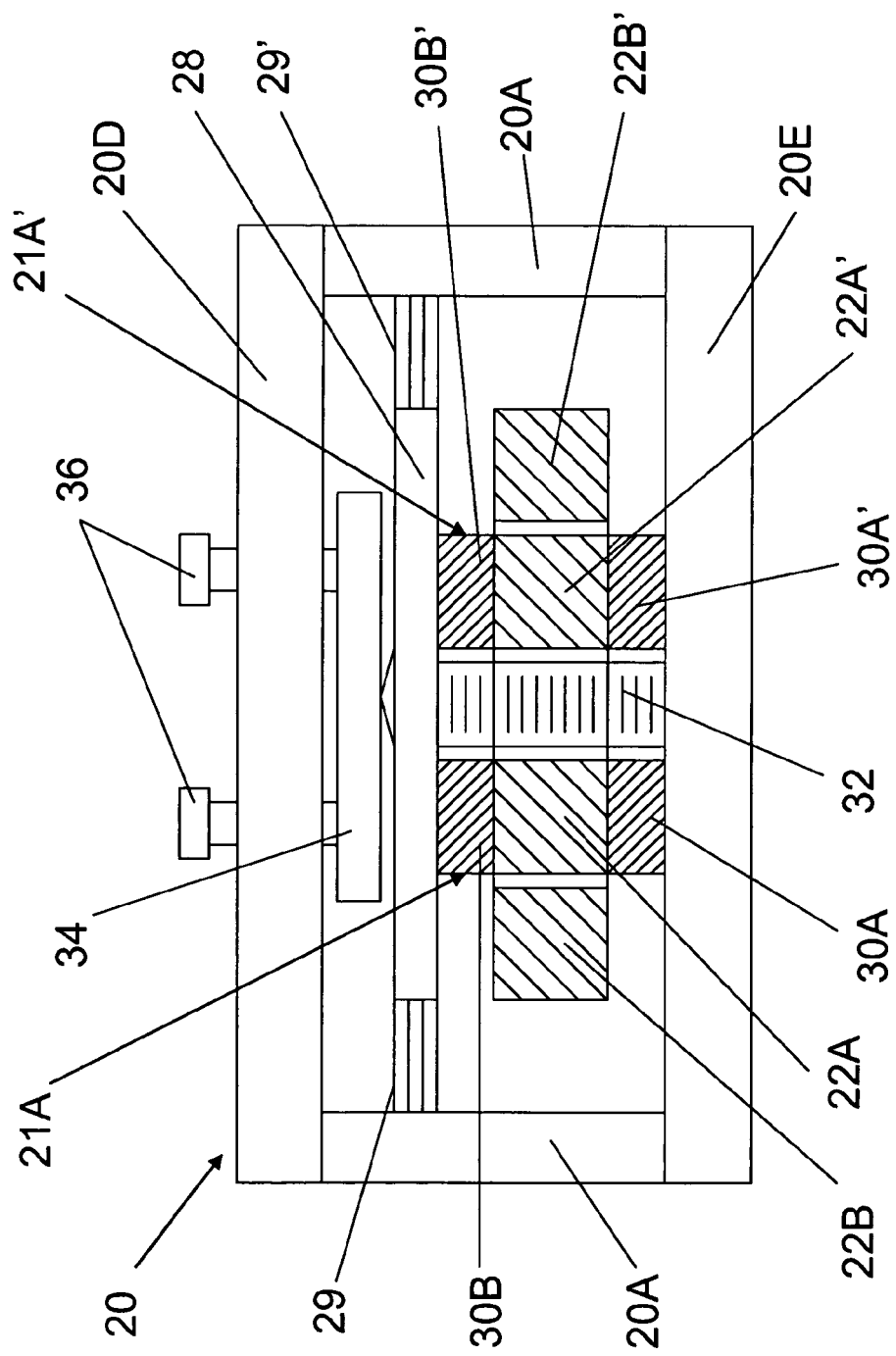
FIG. 5a is a sectional view, taken on line 5a-5a of FIG. 4, showing a pair of clamp components used in this embodiment of the present invention.
Figure 5B:
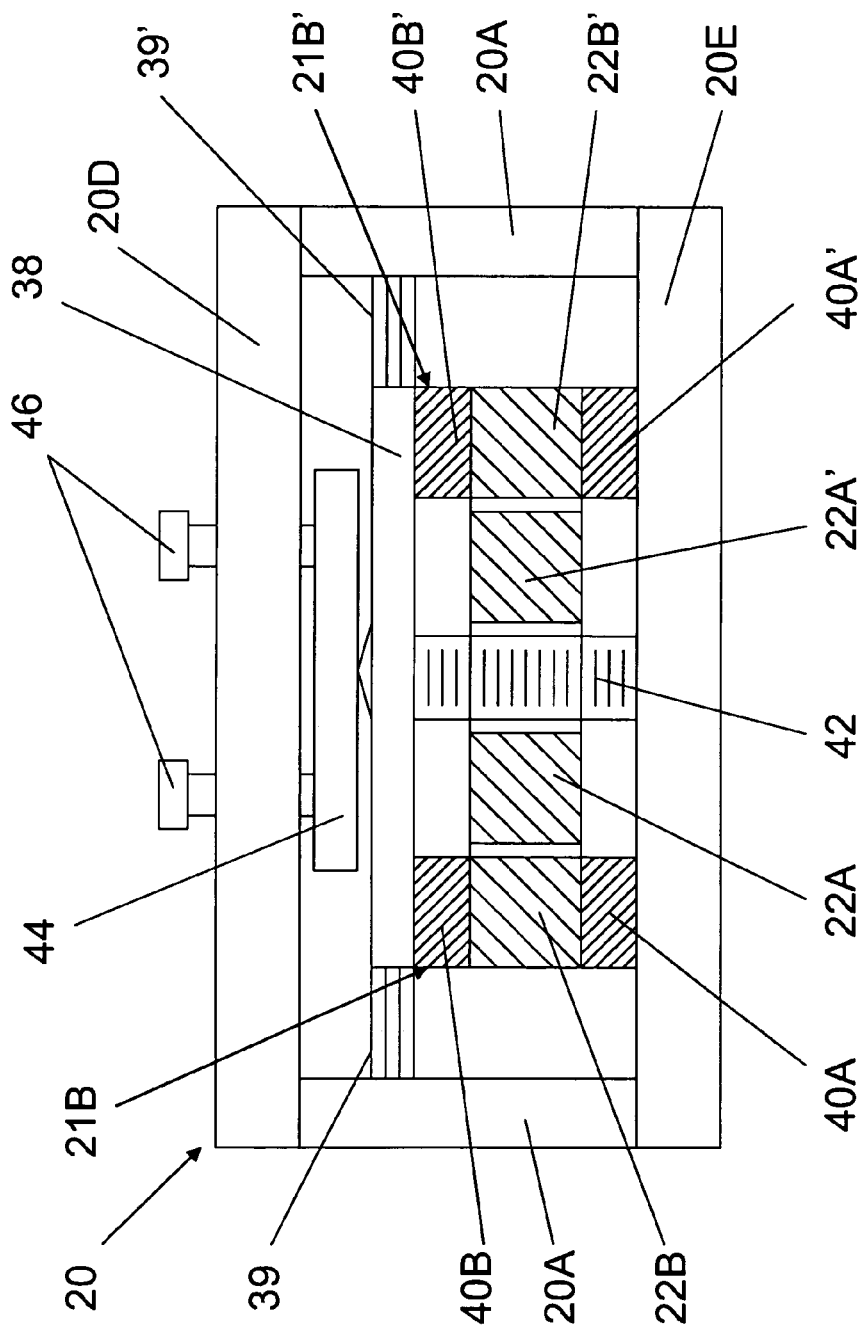
FIG. 5b is a sectional view, taken on line 5b-5b of FIG. 4, showing another pair of clamp components used in this embodiment of the present invention.

FIGS. 4, 5A and 5B show preferred arrangements of the support 20 and the clamping assemblies.

The support 20 is a rectangular casing having sides 20A, front and rear ends 20B and 20C, and top and bottom 20D and 20E. Ends 20B and 20C are apertured to allow free longitudinal movement of the shaft structure shown in FIG. 3. FIGS. 5a and 5b respectively show how the casing supports the clamping assemblies 21A and 21A' for the inner shaft portions and the clamping assemblies 21B and 21B' for the outer shaft portions.

As shown in FIG. 5a, the sides 20A of the casing carry outer ends of flexure pairs 29 and 29', which in turn support a transverse beam 28. Pressure friction blocks 30A and 30A' are arranged to separate the casing bottom 20E from each of the inner shaft portions 22A and 22A', and similar blocks 30B and 30B' are arranged above these shaft portions to separate these from the beam 28. The position of the beam 28 is controlled by a vertical piezoelectric stack 32, located between the inner shaft portions 22A and 22A'. This stack 32, when energized, urges the beam 28 upwards, and a leaf spring 34 acts downwardly on the beam to maintain the stack 32 in compression and to apply pressure to the blocks 30A, 30A', 30B and 30B' when the stack is de-energized. As in the Xu et al patent, the energy applied to the piezoelectric stack 32 can be used to release the clamping force applied by the leaf spring 34; on de-energizing the stack the leaf spring clamps the inner shaft portions 22a and 22a'. Pressure screws 36 which pass through the casing top 20D can be used to regulate the clamping force, which can also be enhanced by friction surfaces applied to the inner surfaces of the blocks 30A, 30A', 30B and 30B'.

FIG. 5b shows a similar arrangement for the outer shaft portions 22B and 22B'. Here the shaft portions may be clamped between lower blocks 40A and 40A' and upper blocks 40B and 40B'. For clamping, the blocks are held under pressure by leaf spring 44 acting on the center of beam 38, controlled by pressure screws 46, the ends of this beam being connected to the casing sides 20A by paired flexures 39 and 39'. The clamping force can be relieved by energizing a central, vertical piezoelectric stack 42 which acts upwardly on the beam 38.

In operation, the piezoelectric actuator 23 is alternately expanded and contracted, while the piezoelectric stacks 32 and 42 are controlled, generally in similar manner to that of the Xu et al. patent, in order to move the shaft assembly, including the inner shaft portions 22A and 22A', outer shaft portions 22B and 22B', and the actuator 23, through the casing. As can be seen in FIG. 4, the amount of travel can be equivalent to the length of the inner shaft portions 22A and 22A', less the fore-and-aft length of the clamping assemblies which act on these shaft portions.

Since the clamp assemblies are separate and can be individually mounted anywhere needed, the frame or casing 20 can be tailored to particular applications, or can be integrated into structures or frameworks with ease. This saves space and allows flexibility.

Instead of single actuators 32 and 42 at the center of the clamp assemblies, double actuators could be used at the outer ends of beams 28 and 38, extended if necessary.

In the design discussed so far, the front ends of the shaft portions 22A, 22B, etc., transmit movement to whatever device is to be moved. FIGS. 6 to 9 show the use of a modified shaft structure which, instead of having a U-shaped inner portion surrounded by a U-shaped outer portion, has a rectangular inner portion surrounded by a hollow rectangular outer portion, with piezoelectric actuators operating between each end of the inner portion and the adjacent surfaces of the outer portion.

Figure 6:
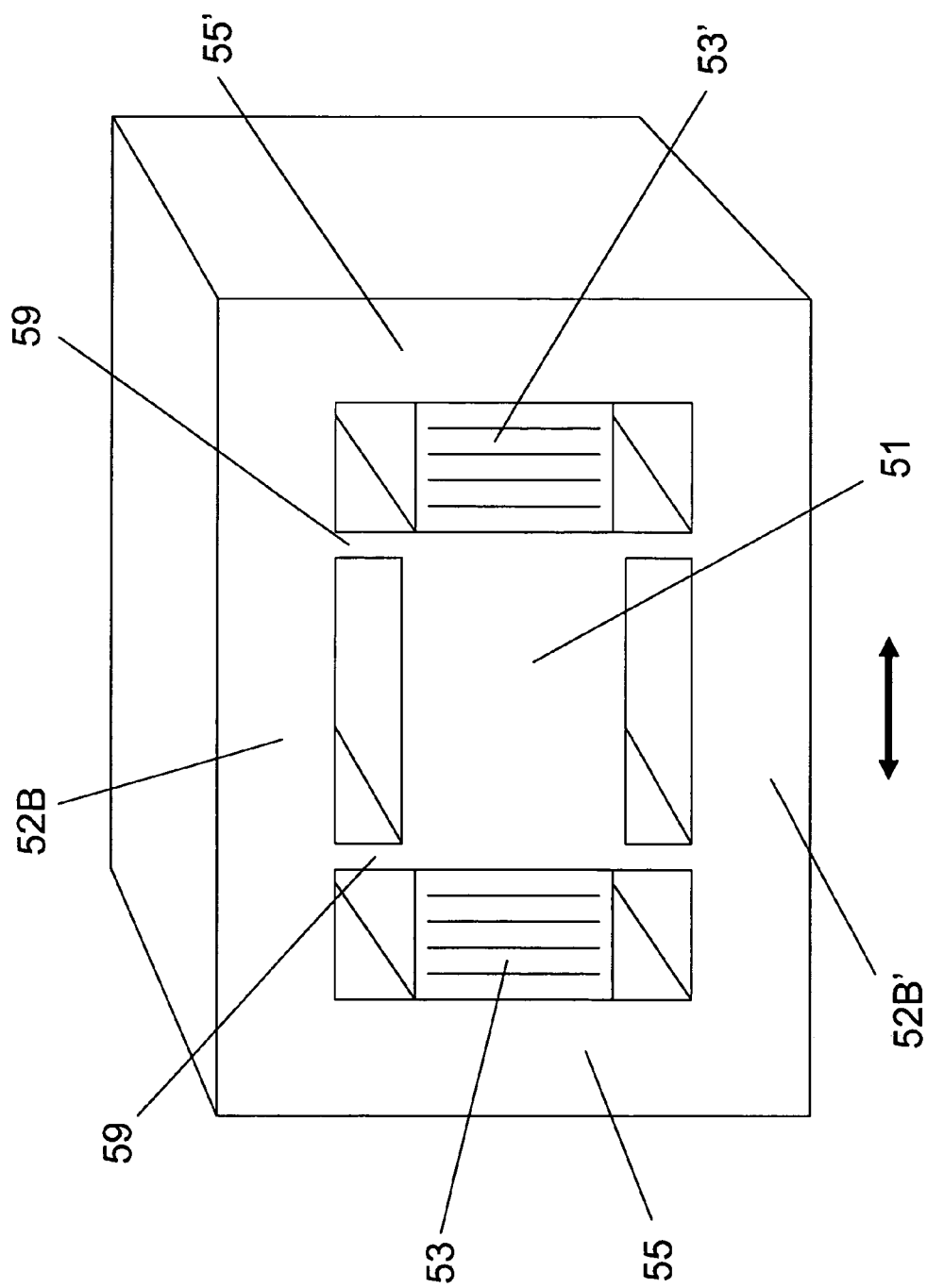
FIG. 6 is a perspective view of a variation of the folded shaft design shown in FIG. 3.

FIG. 6 shows the movable shaft portions of the device. These include an inner, rectangular shaft portion 51 connected to upper and lower, outer shaft portions or limbs 52B and 52B' which are upper and lower sides of a hollow rectangular block 52 which surrounds the shaft portion 51 and which is connected to inner shaft portion 51 by flexible hinges 59. The shaft portions or limbs 52B and 52B' are connected by the rear cross member 55 and front cross member 55' of the block. Piezoelectric actuators 53 and 53' act between the inner shaft portion 51 and the inner faces of cross members 55 and 55'.

The use of a piezoelectric actuator at each end of the shaft portion 51 is one way to improve the stability of the shaft portion. Another way would be to use a spring instead of one of the piezoelectric actuators.

Figure 7:
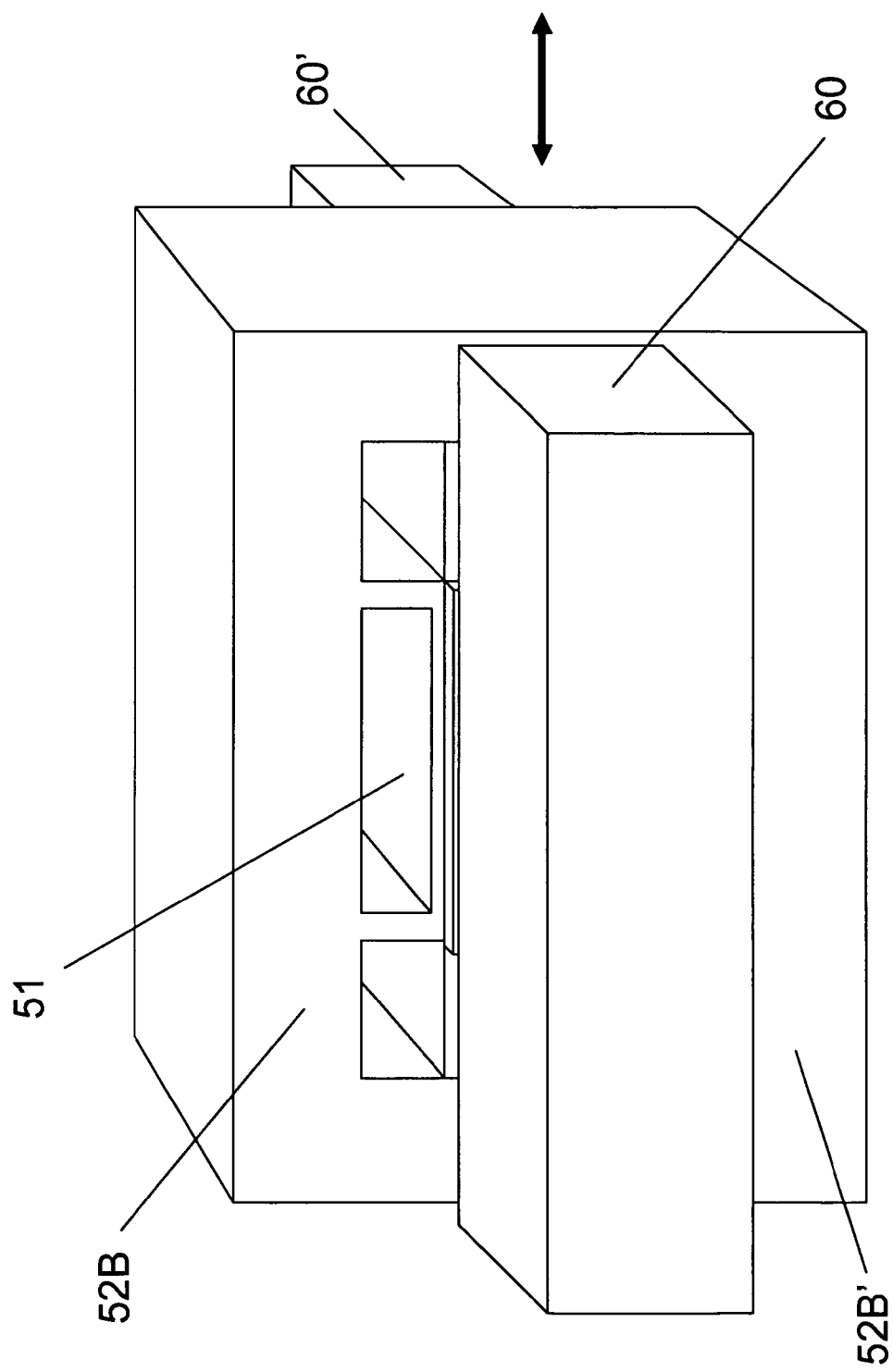
FIG. 7 is a variation of the apparatus using the shaft design of FIG. 6 and showing two additional shaft extensions to give enhanced travel range.
Figure 8:
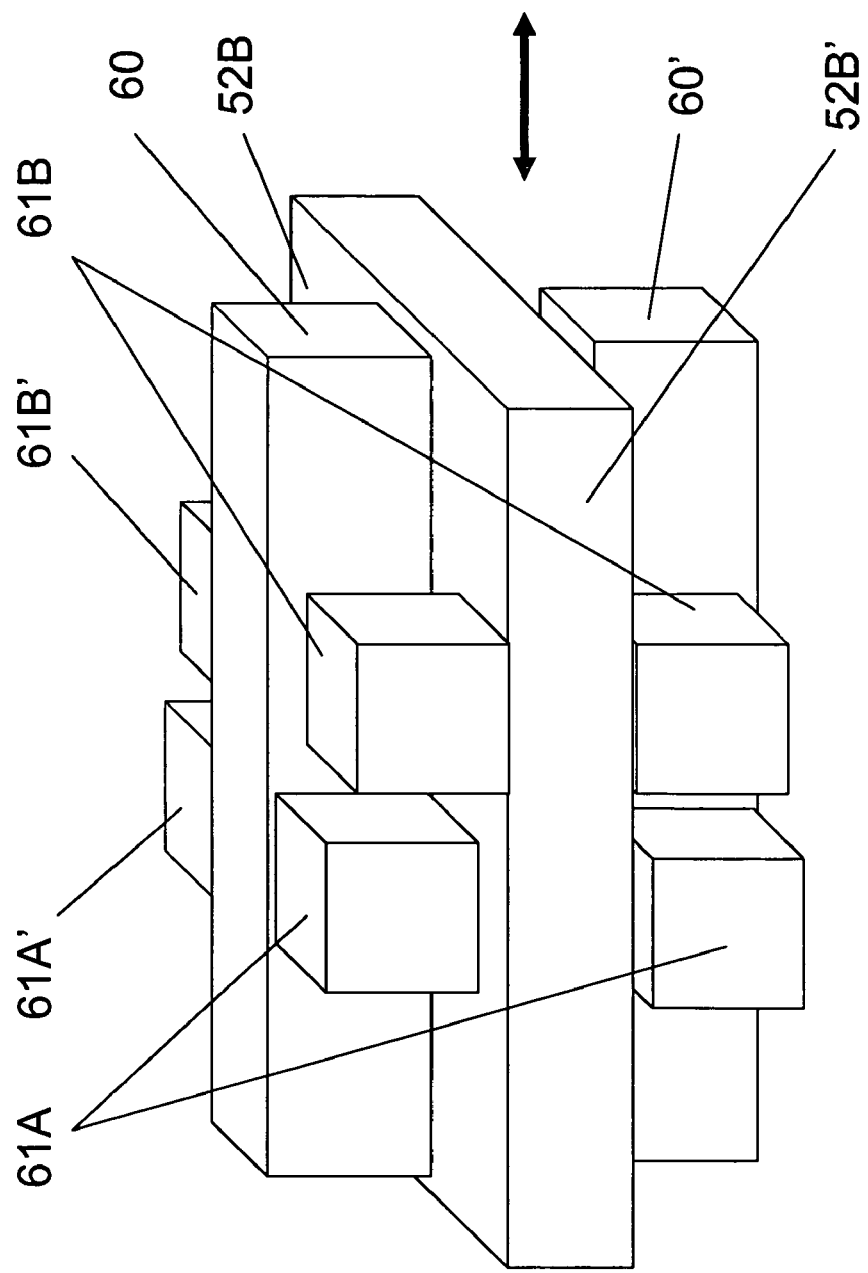
FIG. 8 shows a clamping arrangement suitable for the apparatus of FIG. 7.
Figure 9:
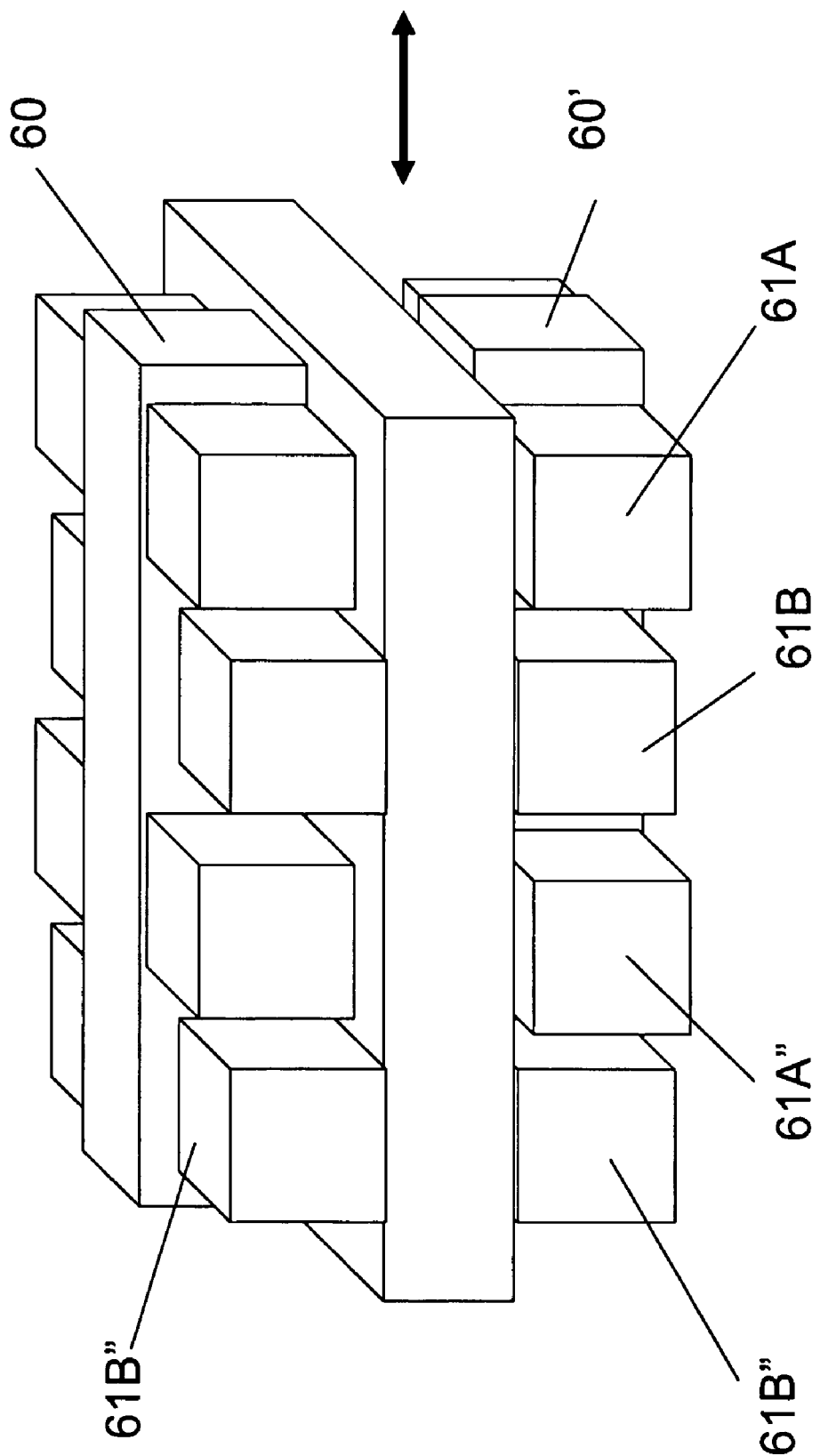
FIG. 9 shows additional clamps for the design of FIG. 8.

FIGS. 7 to 9 show components of clamping arrangements for the shaft portions 51, 52B, and 52B'. While clamping assemblies could conceivably be applied to the side faces of all these shaft portions, since the inner shaft potion 51 here is relatively short it is preferred to add shaft portion extensions in the form of elongate blocks 60, 60' to the sides of this inner shaft portion 51, as shown, to give it a length equivalent to that of the outer portions or limbs 52B, 52B'. As shown in FIG. 8, clamping assemblies 61A and 61A' can act horizontally on the sides of elongate blocks 60 and 60' which are in upper and lower positions in FIG. 8, while clamping assemblies 61B and 61B' act vertically on sides of the outer shaft portions 52B and 52B' which are perpendicular to the sides of 60, 60'.

Since here the blocks 60 and 60' constitute elongate extensions of the internal movable member 51, the latter itself need not be elongate, and may be quite short.

FIG. 9 shows the use of additional clamp assemblies 61A", 61B", used on the same shaft portions, to provide extra or redundant braking forces. It may be noted that in FIG. 9, especially, some of the clamping members may at times be behind the front of actuator 53, so that it is not essential that all of the clamp members be in front of the extension actuator at all times.

Figure 10A:
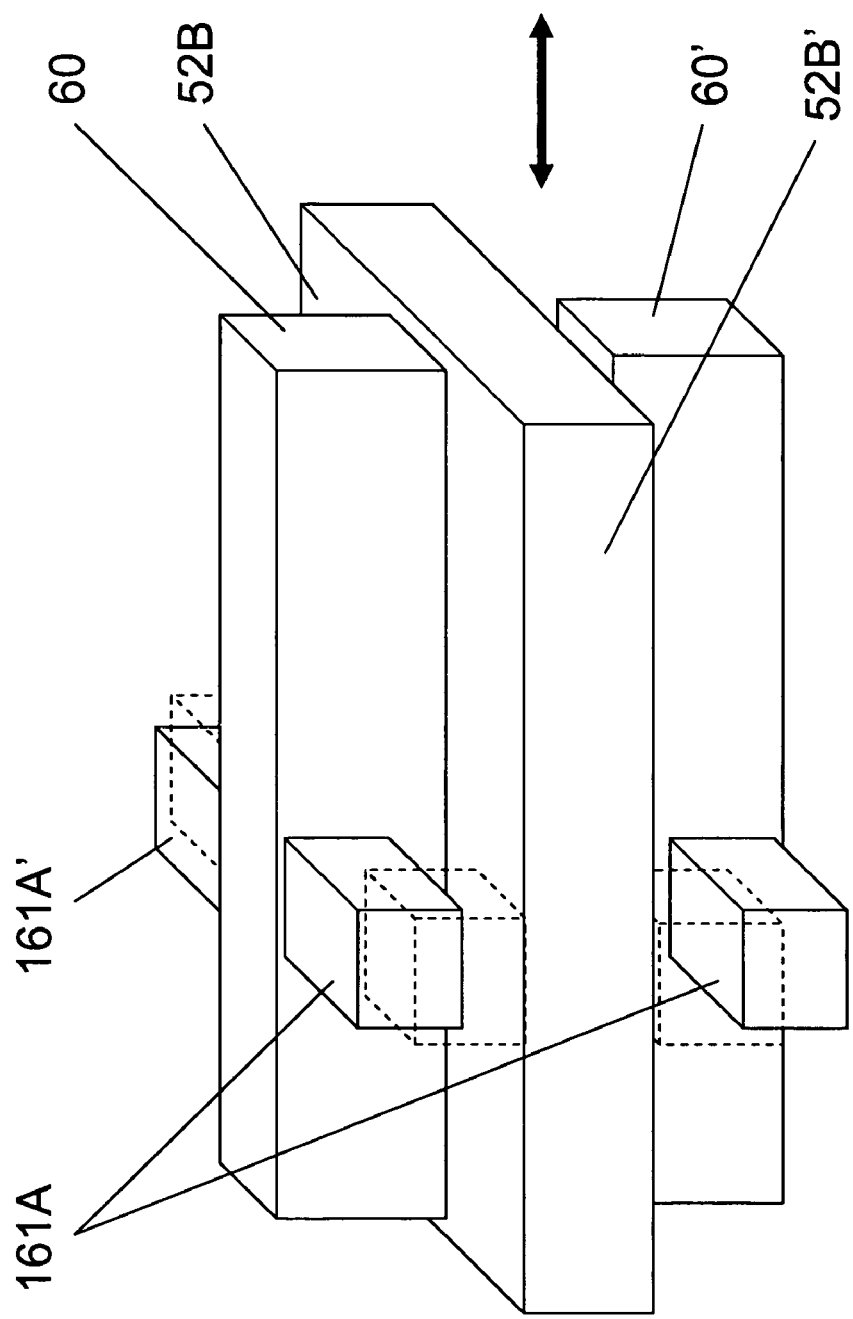
FIGS. 10a and 10b show two positions of a clamping arrangement which can be used as an alternative to that of FIG. 8.
Figure 10B:
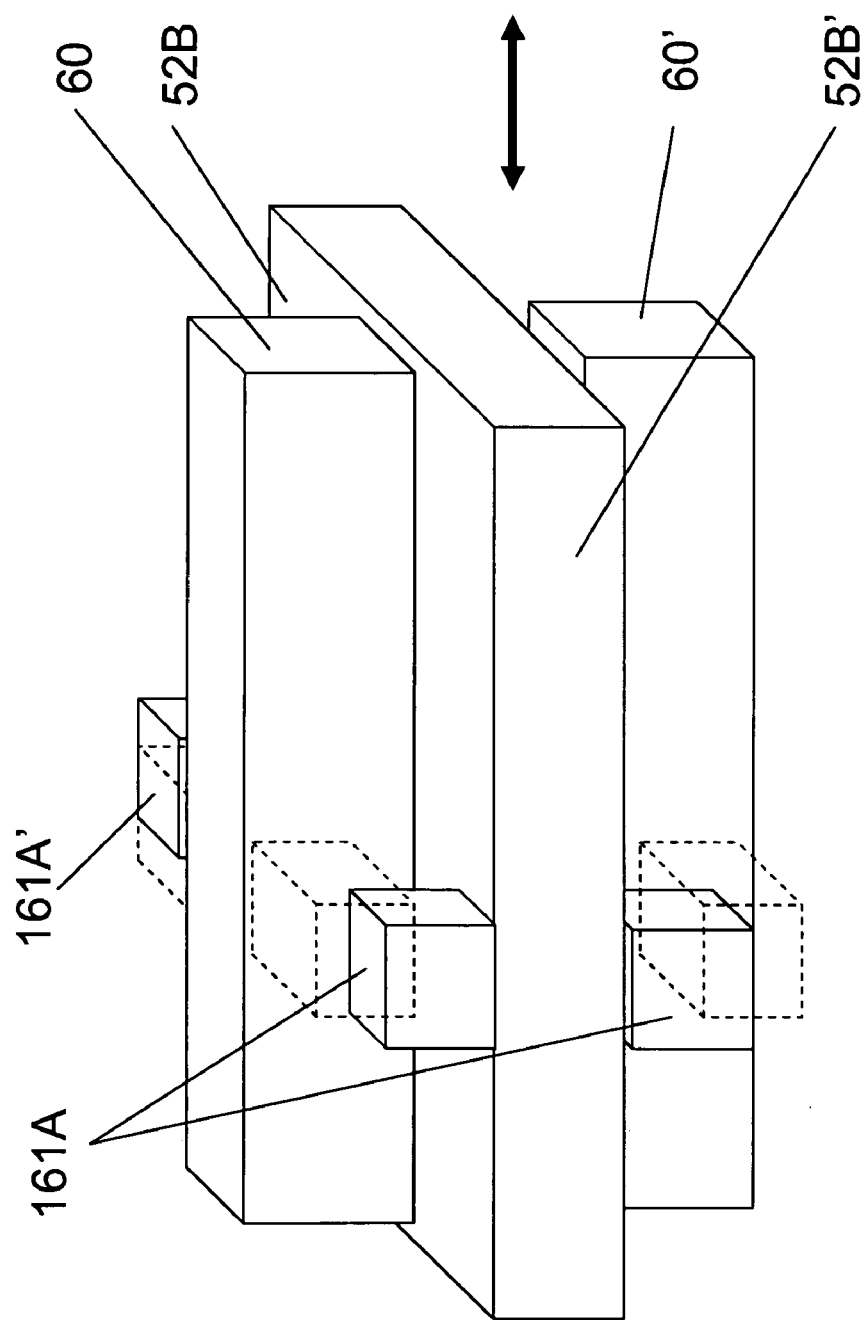
Figure 11A:
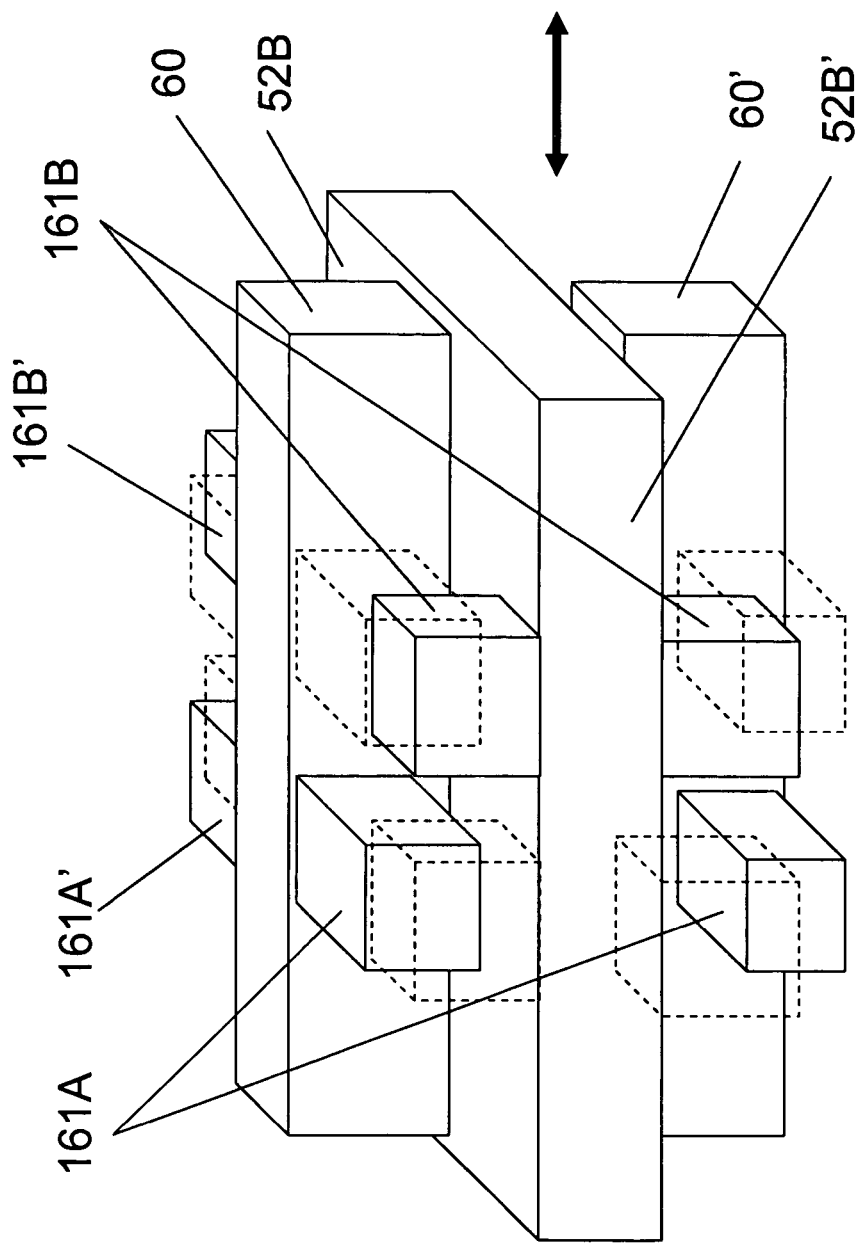
FIGS. 11a and 11b show two positions of a clamp arrangement which can be used as an alternative to that of FIG. 9.
Figure 11B:
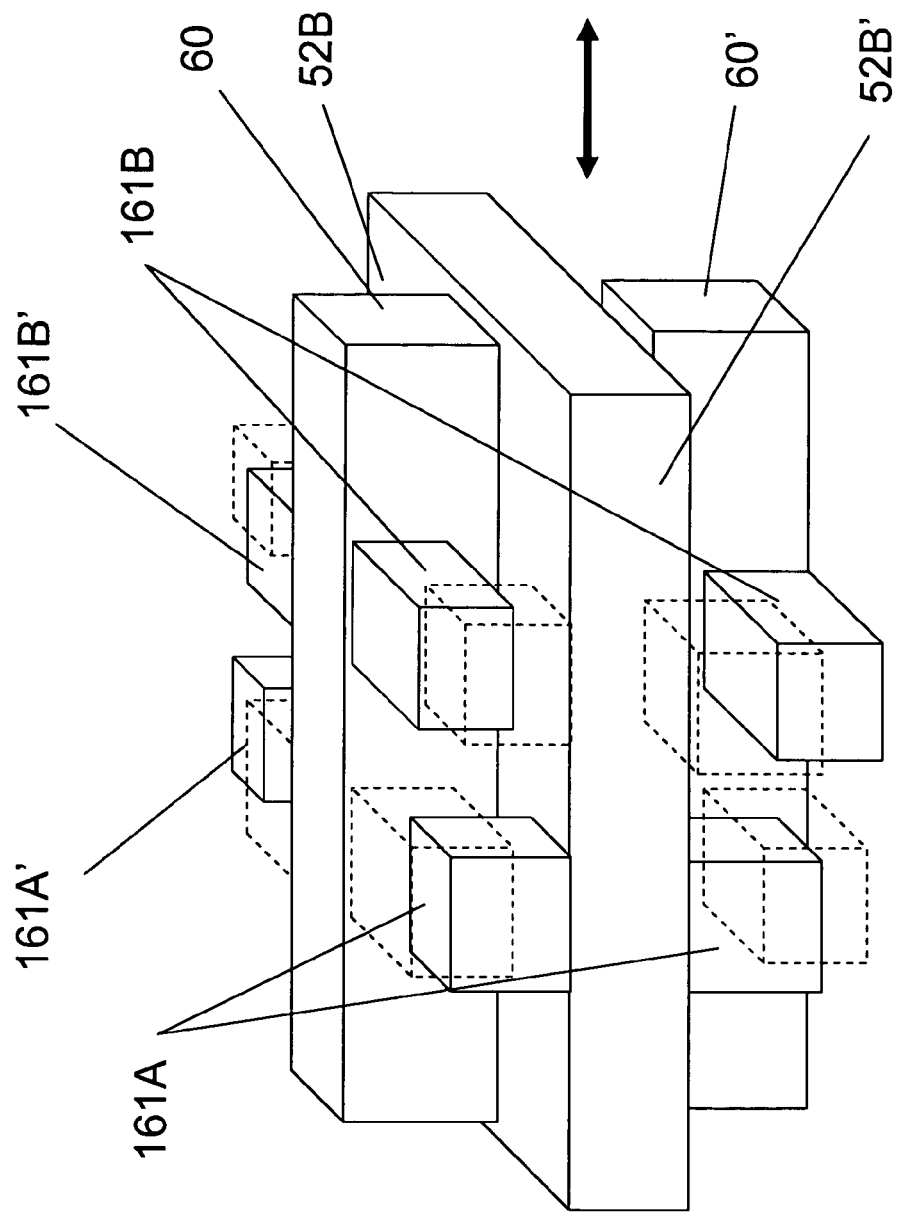

While in FIGS. 8 and 9 the clamps 61A, 61A' are used to act horizontally on the shaft portions 60 and 60', and separate clamps 61B and 61B' act vertically on shaft portions 52B and 52B', it is possible that one pair of clamps can apply a horizontal clamping action on portions 60 and 60' in one state, and in another state could apply a vertical clamping action on shaft portions 52B and 52B'. This is illustrated in FIGS. 10a and 10b showing an alternative to the clamping arrangement of FIG. 8, in which clamping members 161A and 161A' can move from a first position (FIG. 10a) to a second position (FIG. 10b) to act respectively on the different shaft portions. FIGS. 11a and 11b similarly show an alternative to FIG. 9, where clamping members 161A, 161A', 161B and 161B' can each move between two positions to act on the different shaft portions. In this way the overall length of the clamps may be reduced, giving extra length of travel for the same length of shaft portions.

SUMMARY

1. Unlike in the Xu et al. design, embodiments of the present invention do not require that the clamps be widely spaced apart at the two ends of the frame/housing. They can be allowed to be, for example, located at the middle of the actuator in the motion direction. Whereas in Xu et al. giving greater range to an actuator requires extending the distance between the clamps, and thus extending the frame, in embodiments of this invention extending the range only requires use of longer shaft portions.
2. The clamping force directions of the clamps (two or more which can be involved in a design, as we have already shown in FIG. 9) are not limited to one direction. For example, one can be in the Y-direction while the other is in the X-direction to achieve best design goal (e.g. performance, size, and simplification of the manufacturing process).

What is claimed is:

1. A linear electromechanical translation apparatus comprising:

a support;

first and second clamp assemblies fixedly secured to the support;

first and second elongate movable members each extending through one of the clamp assemblies; and an extension actuator connected between the movable members and adapted to move each one of the elongate movable members longitudinally relative to the other member as the extension actuator is extended or retracted;

the first elongate movable member having a rear end connected to a front end of said extension actuator, and said second movable member having a rear end connected to a rear end of the actuator and a forwardly extending elongate portion which lies beside and parallel to said first elongate movable member.

2. Apparatus according to claim 1, wherein both of the clamp assemblies are located forward of the front end of the actuator.

3. Apparatus according to claim 1, wherein said first elongate movable member occupies a major part of the overall length of both of said movable members.

4. Apparatus according to claim 1, wherein the second movable member comprises a pair of parallel limbs joined at their rear ends by a cross member which abuts the rear end of the extension actuator, and wherein the first movable member includes an inner movable member which lies inside the limbs of the second movable member, and wherein end portions of the inner movable member are connected to the said limbs by flexures which allow relative longitudinal movements of the members.

5. Apparatus according to claim 4, wherein said second movable member has said parallel limbs joined at the front end by a further, front cross member and is such that the limbs and cross members of said second movable member surround the inner movable member, and wherein a second extension actuator is provided between the rear of the front cross member and the front end of said inner movable member.

6. Apparatus according to claim 4, wherein said second movable member has said parallel limbs joined at the front end by a further, front cross member and is such that the limbs and cross members of said second movable member surround the inner movable member, and wherein a spring is provided between the rear of the front cross member and the front end of said inner movable member.

7. Apparatus according to claim 4, wherein said inner movable member has one or more elongate extensions which are parallel to said parallel limbs and which constitute said elongate first movable member extending through one of the clamp assemblies.

8. Apparatus according to claim 1, wherein said first elongate movable member is constituted by an extension of a member which has its rear end connected to the front end of said extension actuator.

9. Apparatus according to claim 1, wherein said movable members include a first, inner movable member having a rear end attached to the front end of said extension actuator, a second, outer elongate movable member having two elongate parallel limbs joined by a cross member, said cross member being attached to said rear end of said extension actuator, and said inner movable member having at least one elongate extension attached thereto so as to constitute said first elongate movable member, said clamping assemblies receiving and being adapted to clamp onto each of said elongate extension of said first movable member and said limbs of said second movable member.

10. Apparatus according to claim 9, wherein said clamping assemblies act in a vertical direction on one of said elongate movable members and in a horizontal direction on the other of said elongate movable members.

11. Apparatus according to claim 1, wherein each clamp assembly comprises pressure means and clamp actuator means acting in opposition, the pressure means for applying, when the actuator means is de-energized, clamping force to clamp the associated movable member to the clamp assembly, and the clamp actuator means, when energized, acting against the pressure means to release the movable member, and control means for selectively actuating the extension actuator and the clamp actuators so as to impart stepwise motion of the movable members relative to the support.

12. Apparatus according to claim 1, wherein said clamp assemblies include actuator means comprising a single clamp actuator means located between the limbs, which clamp actuator means acts in opposition to a pressure member that applies pressure to clamp the elongate movable members to the clamp assembly.

13. Apparatus according to claim 5, wherein said inner movable member has one or more elongate extensions which are parallel to said parallel limbs and which constitute said elongate first movable member extending through one of the clamp assemblies.

14. Apparatus according to claim 6, wherein said inner movable member has one or more elongate extensions which are parallel to said parallel limbs and which constitute said elongate first movable member extending through one of the clamp assemblies.

* * * * *